US010967515B2

(12) United States Patent
Lee et al.

(10) Patent No.: US 10,967,515 B2
(45) Date of Patent: Apr. 6, 2021

(54) APPARATUS FOR REMOTELY CONTROLLING ROBOTS AND CONTROL METHOD THEREOF

(71) Applicant: Daegu Gyeongbuk Institute of Science and Technology, Daegu (KR)

(72) Inventors: Seung Yeol Lee, Daegu (KR); Dae Jin Kim, Daegu (KR); Sung Hoon Eom, Daegu (KR); Jeon Il Moon, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 286 days.

(21) Appl. No.: 16/168,846

(22) Filed: Oct. 24, 2018

(65) Prior Publication Data

US 2019/0054623 A1 Feb. 21, 2019

Related U.S. Application Data

(63) Continuation of application No. 14/929,432, filed on Nov. 2, 2015, now abandoned.

(30) Foreign Application Priority Data

May 4, 2015 (KR) .................. 10-2015-0062727

(51) Int. Cl.
*G06F 17/00* (2019.01)
*B25J 9/16* (2006.01)
(52) U.S. Cl.
CPC .......... *B25J 9/1682* (2013.01); *B25J 9/1689* (2013.01); *G05B 2219/39146* (2013.01); *Y10S 901/02* (2013.01)

(58) Field of Classification Search
CPC .................. B25J 9/1682; B25J 9/1689; G05B 2219/39146; Y10S 901/02
(Continued)

(56) References Cited

U.S. PATENT DOCUMENTS 6,624,388 B1 9/2003 Blankenship et al.
6,853,867 B1 2/2005 Klindt et al.
(Continued)

FOREIGN PATENT DOCUMENTS

KR 10-2013-0027383 A 3/2013

*Primary Examiner* — Ronnie M Mancho
(74) *Attorney, Agent, or Firm* — Lex IP Meister, PLLC (57) ABSTRACT

An apparatus for remotely controlling field robots, includes: an interface unit; a work command generator generating a work command signal for operating field robots; an autonomous command generator which generates an autonomous operation command signal for controlling an operation of a second field robot when a user selects a following mode and the work command generator generates a work command signal for a first field robot to correspond to the following mode, or generates an autonomous operation command signal for controlling operations of the first field robot and the second field robot in order to operate an object of work when the user selects an object mode and the work command generator generates a work command signal for the object of work to correspond to the object mode; and a communication unit transmitting the generated autonomous operation command signal to the first field robot and the second field robots.

8 Claims, 9 Drawing Sheets

(58) Field of Classification Search
USPC .................................................... 700/248
See application file for complete search history.

(56) References Cited

U.S. PATENT DOCUMENTS

| | | | |
|---|---|---|---|
| 7,024,255 B1 | 4/2006 | Brown | |
| 7,028,204 B2 | 4/2006 | Jammes | |
| 7,137,107 B1 | 11/2006 | Brown | |
| 7,525,274 B2 * | 4/2009 | Kazi | B25J 9/1682 |
| | | | 318/568.1 |
| RE45,391 E * | 2/2015 | Summers | G05B 19/41825 |
| | | | 700/193 |
| 9,026,248 B1 * | 5/2015 | Hickman | G05B 19/418 |
| | | | 700/248 |
| 9,298,863 B2 | 3/2016 | Hazan | |
| 9,333,649 B1 | 5/2016 | Bradski | |
| 9,910,982 B2 | 3/2018 | Chow | |
| 2003/0100957 A1 | 5/2003 | Chaffee | |
| 2004/0257021 A1 * | 12/2004 | Chang | G05B 19/427 |
| | | | 318/568.21 |
| 2005/0166413 A1 | 8/2005 | Crampton | |
| 2006/0111811 A1 | 5/2006 | Okamoto | |
| 2007/0156286 A1 | 7/2007 | Yamauchi | |
| 2007/0194097 A1 | 8/2007 | Jones | |
| 2007/0260356 A1 * | 11/2007 | Kock | B25J 9/1641 |
| | | | 700/261 |
| 2007/0264106 A1 | 11/2007 | van der Meulen | |
| 2008/0316368 A1 * | 12/2008 | Fritsch | H04N 5/23203 |
| | | | 348/722 |
| 2009/0204260 A1 | 8/2009 | Bryne | |
| 2009/0204261 A1 * | 8/2009 | Strand | B25J 9/1656 |
| | | | 700/264 |
| 2009/0289591 A1 * | 11/2009 | Kassow | B25J 18/00 |
| | | | 318/568.13 |
| 2010/0243344 A1 | 9/2010 | Wyrobek | |
| 2010/0274385 A1 | 10/2010 | Eriksson | |
| 2012/0143371 A1 | 6/2012 | Selnes | |
| 2012/0303318 A1 * | 11/2012 | Milenkovic | A61B 18/18 |
| | | | 702/150 |
| 2013/0031037 A1 | 1/2013 | Brandt | |
| 2013/0211766 A1 * | 8/2013 | Rosenberg | G01B 21/16 |
| | | | 702/97 |
| 2015/0253766 A1 * | 9/2015 | Pettersson | G05B 19/41805 |
| | | | 700/168 |
| 2015/0296594 A1 * | 10/2015 | Blum | H05B 45/20 |
| | | | 315/158 |
| 2015/0314448 A1 * | 11/2015 | Zhang | B25J 9/1689 |
| | | | 700/245 |
| 2016/0271796 A1 | 9/2016 | Babu | |
| 2017/0083000 A1 * | 3/2017 | Wu | G05B 19/41865 |
| 2017/0083009 A1 * | 3/2017 | Wu | G05B 19/4187 |

* cited by examiner

SURVEY

5. Which one do you want to perform using a robot of the following?

(a) Transferring a package     (b) Founding pipes     (c) Rotating a valve

Previous                                              Next

APPARATUS FOR REMOTELY CONTROLLING ROBOTS AND CONTROL METHOD THEREOF

CROSS REFERENCE TO PRIOR APPLICATION

This application is a Continuation Application of U.S. patent application Ser. No. 14/929,432 filed on Nov. 2, 2015 under 35 U.S.C. § 120, which claims priority to and the benefit of Korean Patent Application No. 10-2015-0062727 filed in the Korean Intellectual Property Office on May 4, 2015, the entire contents of which are incorporated herein by reference.

BACKGROUND

1. Field of the Disclosure

The present disclosure relates to an apparatus for remotely controlling one or more robots and a control method thereof, and more particularly, to an apparatus for remotely controlling one or more robots to perform specific work in cooperation with each other instead of a worker in unstructured and dangerous environments and a control method thereof.

2. Description of the Related Art

In general, a field robot commonly used in the fields of construction, earthwork, military, subsea, and space performs hazardous and difficult work instead of human in unstructured and dynamic environments.

A robot teleoperation system is a system in which an operator remotely controls a robot (for example, a field robot) placed at a remote location to perform specific work instead of a worker. In this system, the operator-robot ratio may be variously constructed in 1:1, 1:N, N:1, and N:N.

Recent robot teleoperation systems commonly use an 1:1 remote control method in which one remote control device collects operation commands from the operator and one field robot performs work corresponding to the operation commands transmitted from the remote control device instead of the worker.

However, when the work to be performed is complex, the 1:1 remote control method may have lots of limitations in performing the work, and fatigue of the operator may increase since only one person generates the entire operation commands to control the robot. In addition, many teleoperation tasks demand the operator to have high remote control skill, and in particular, it may become impossible to remotely control the robot if a time delay occurs. The 1:1 remote control method is inappropriate for the work dealing with large and heavy objects (for example, opening and closing a large-sized valve or replacing a large-sized pipe) due to limitations of a workspace and safety load permitted to one robot.

To solve the above problems, a plurality of 1:1 remote control systems may be employed, but the number of the operators increases as the number of operated systems increases, and thus it may bring some problems in interface and communication between the operators, increasing labor costs due to the increased operators. Accordingly, a field robot integrated control system using an 1:N remote control method in which one operator controls a plurality of field robots is proposed as a technology for performing specific tasks that are difficult to be performed with the 1:1 remote control method.

Korean Patent Laid-Open Publication No. 10-2013-0027383 published on Mar. 15, 2013 discloses a background technique of the present invention.

SUMMARY

The present disclosure has been made in an effort to provide an apparatus for remotely controlling one or more robots to perform specific work in cooperation with each other instead of a worker in unstructured and dangerous environments and a method thereof To accomplish the objects of the present disclosure, an exemplary embodiment of the present disclosure provides an apparatus for remotely controlling one or more field robots, which may includes: an interface unit which receives information about field robots to be remotely controlled and selection of an operation mode for the field robots from a user operation device, and also receives an operation command signal for controlling operations of the field robots; a work command generator which generates a work command signal for operating the field robots to be remotely controlled or an object of work to correspond to the received information about the operation mode and the received operation command signal; an autonomous command generator which generates an autonomous operation command signal for controlling an operation of a second field robot when a user selects a following mode and the work command generator generates a work command signal for a first field robot to correspond to the following mode, or generates an autonomous operation command signal for controlling operations of the first field robot and the second field robot in order to operate the object of work when the user selects an object mode and the work command generator generates a work command signal for the object of work to correspond to the object mode; and a communication unit which transmits the generated autonomous operation command signal to the first field robot and the second field robot.

In the apparatus, the user operation device may detect a motion of the user, and generates the operation command signal corresponding to the detected motion.

The work command generator may generate the work command signal allowing one field robot to be remotely controlled to operate according to the user's motion when the user selects a monopoly mode.

In addition, when the user selects the following mode, the work command generator may generate the work command signal allowing the first field robot to operate according to the user's motion, and the autonomous command generator may generate the autonomous operation command signal that is same as the work command signal or symmetric to the work command signal, centering a particular rotation axis.

In addition, when the user selects the following mode, the autonomous command generator may generate the autonomous operation command signal for controlling the operations of the first field robot and the second field robot in order to operate the object of work according to the work command signal.

The apparatus for remotely controlling one or more field robots may further include a storage unit which stores the work command signals, the autonomous operation command signals, and information about work performance supplied from the field robots. In this case, the autonomous command generator may extract the autonomous operation command signal corresponding to the work command signal to be repeatedly executed, among the already stored work command signals and autonomous operation command signals.

In addition, when the communication unit receives the work performance information including at least one of location information, sound information, image information, and contact information, the autonomous command generator may directly modify the autonomous operation command signal to correspond to the work performance information. Differently, the autonomous command generator may transmit the work performance information to the user operation device, may receive the modified operation command signal from the user operation device, and then may modify the autonomous operation command signal to correspond to the modified operation signal.

Another embodiment of the present embodiment provides a control method of the apparatus for remotely controlling one or more field robots, which may includes: a step of receiving information about operations of field robots to be remotely controlled and selection of an operation mode for the field robots from a user operation device, together with an operation command signal; a step of generating a work command signal for operating the field robots to be remotely controlled or an object of work to correspond to the operation mode and the operation command signal; a step of generating an autonomous operation command signal for controlling an operation of a second field robot when a user selects a following mode and the work command signal for a first field robot is generated, or generating an autonomous operation command signal for controlling operations of the first field robot and the second field robot in order to operate the object of work according to the work command signal when the user selects an object mode and the work command signal for the object of work is generated; and a step of transmitting the autonomous operation command signal to the first field robot and the second field robot.

The robot teleoperation system using the robot teleoperating device of the present disclosure and the control method thereof can be applied to outdoor tasks that the 1:1 remote control system cannot perform due to some technical limitations. In addition, the robot teleoperation system of the present disclosure can minimize labor of the operator. Accordingly, some problems, such as degrade of efficiency and quality of the work, and occurrence of negligent accidents that may occur when fatigue of the operator increases can be resolved.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The present disclosure may be understood more readily by reference to the following detailed description of embodiments and accompanying drawings. However, the present disclosure may be embodied in many different forms, and should not be construed as being limited to the embodiments set forth herein. The drawings and description are to be regarded as illustrative in nature and not restrictive. Like reference numerals designate like elements throughout the specification.

Hereinafter, an exemplary embodiment of the present disclosure will now be described in detail with reference to the accompanying figures.

Figure 1:
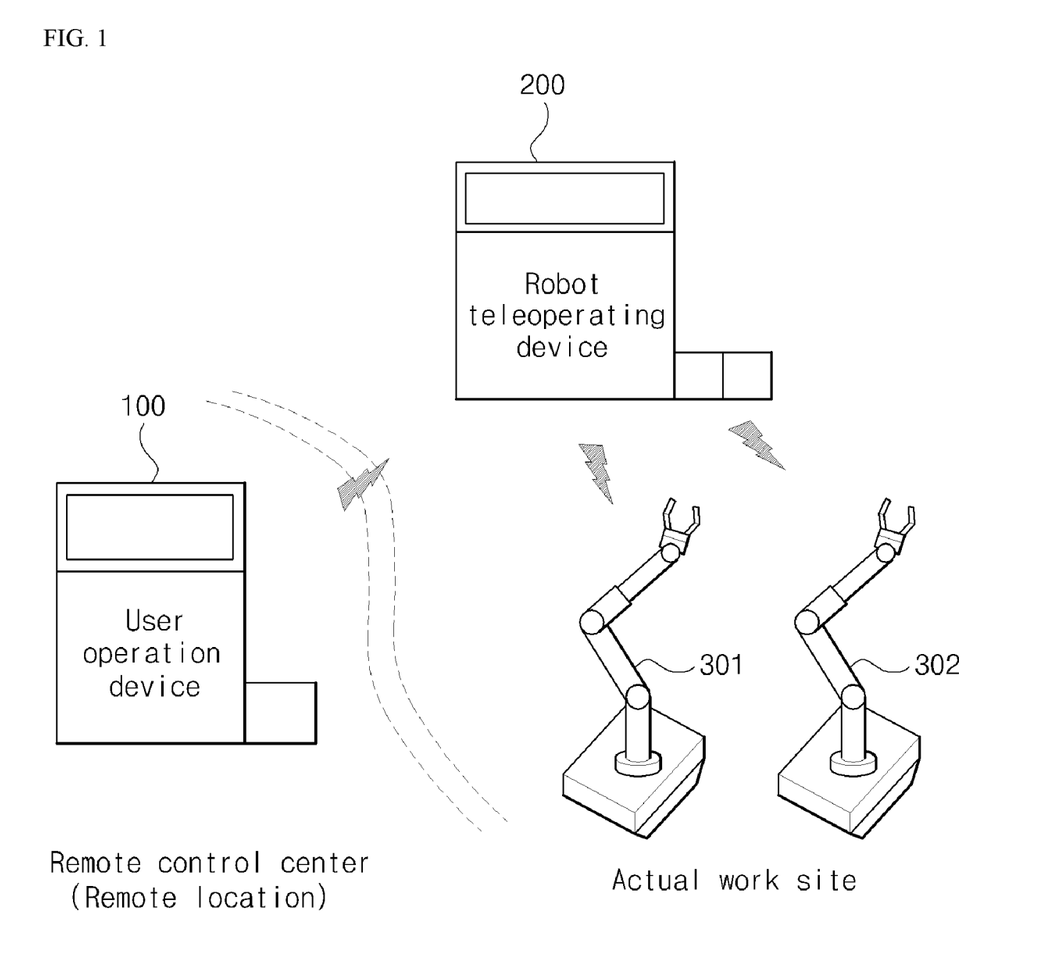
FIG. 1 is a schematic diagram for illustrating a robot teleoperation system according to an exemplary embodiment of the present disclosure.

FIG. 1 is a schematic diagram for illustrating a robot teleoperation system according to an exemplary embodiment of the present disclosure.

Referring to FIG. 1, the robot teleoperation system includes a user operation device 100, a robot teleoperating device 200, and one or more field robots 301 and 302. The robot teleoperating device 200 is connected to the user operation device 100 and the field robots 301 and 302 through a network.

In this structure, the network means a communication linking system allowing the devices and robots to exchange information with each other. Examples of the network are short-range communications including Bluetooth, NFC (near field communication), Zigbee, Wi-Fi, and WAVE (wireless access in vehicular environment), and long-range communications including 3G, 4G, LTE, and LTE-A mobile communications, but the present disclosure is not necessarily limited thereto.

In particular, the user operation device 100 placed at a remote location may be connected to the robot teleoperating device 100 through the long-range communication, and the field robots 301 and 302 and the robot teleoperating device 200 which are located in a work site may be connected to each other through the short-range communication.

First, the user operation device 100 receives information about the field robot to be remotely controlled and information about an operation mode of the field robot from a user, and transmits them to the robot teleoperating device 200. The user operation device 100 detects a motion of the user, generates an operation command signal based on the detected motion, and transmits the generated operation command signal to the robot teleoperating device 200.

In addition, the user operation device 100 receives information about work performance that is detected by the field robots 301 and 302. The user operation device 100 may output the received work performance information to the user, and it may transmit the modified operation command signal transmitted from the user to the robot teleoperating device 200.

The robot teleoperating device 200 is placed in the actual work site with the field robots 301 and 302 to manage at least one of the field robots 301 and 302, serving as a relay between the user operation device 100 and the field robots 301 and 302.

The robot teleoperating device 200 receives the information about the field robots to be remotely controlled from the user operation device 100 placed at a remote location, together with the information about the operation mode. The robot teleoperating device 200 also receives the operation command signal for controlling at least one of the field robots 301 and 302 from the user operation device 100, generates a work command signal and an autonomous operation command signal depending on the selected operation mode, and then transmits them to the field robots 301 and 302, thereby controlling the field robot 301 and 302.

The robot teleoperating device 200 receives the work performance information from the field robots 301 and 302, and may generate a work command signal and an autonomous operation command signal based on the received information in order to enable the field robots 301 and 302 to adaptively operate to the work site.

Finally, the field robots 301 and 302 are located in the actual work site and operate in response to the work commend signal and the autonomous operation command signal transmitted from the robot teleoperating device 200.

The field robots 301 and 302 may detect work performance information including at least one of location information, sound information, image information, and contact information using various sensors. The field robots 301 and 302 transmit the detected work performance information to the robot teleoperating device 200, and may operate by receiving the work command signal and the autonomous operation command signal suitable for the situation of the work site from the robot teleoperating device 200.

Figure 2:
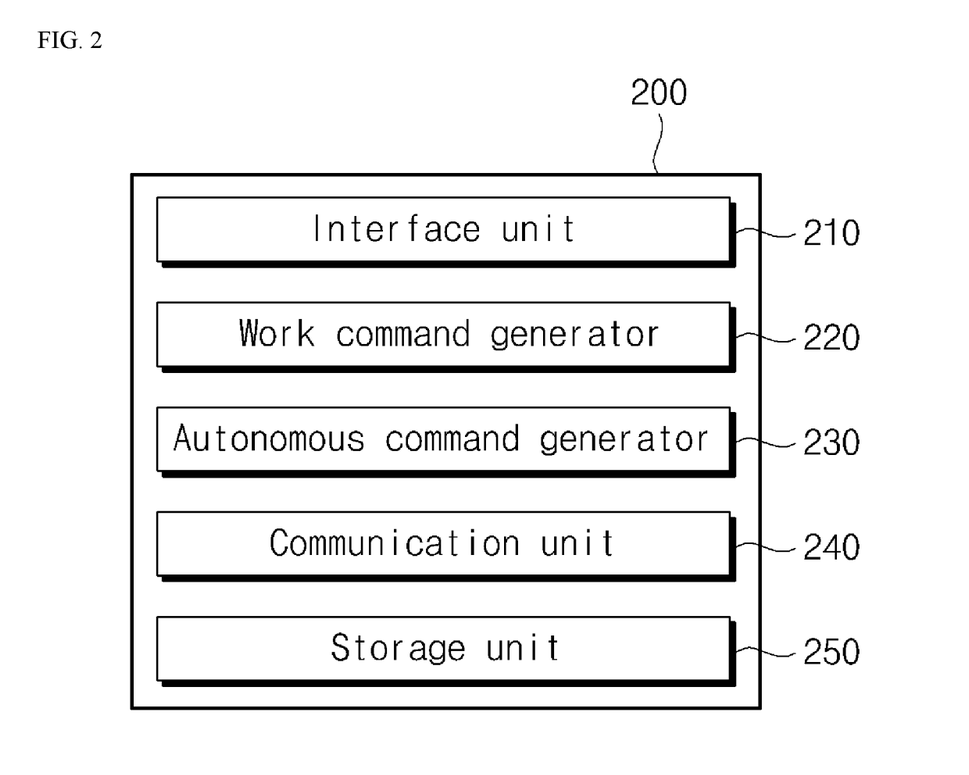
FIG. 2 is a block diagram for illustrating the robot teleoperating device according to an exemplary embodiment of the present disclosure.

FIG. 2 is a block diagram for illustrating the robot teleoperating device according to an exemplary embodiment of the present disclosure.

Referring to FIG. 2, the robot teleoperating device 200 includes an interface unit 210, a work command generator 220, an autonomous command generator 230, a communication unit 240, and a storage unit 250.

The interface unit 210 communicates with the user operation device 100. The interface unit 210 receives information about the field robot 301 to be remotely controlled from the user operation device 100 together with information about an operation mode, and then receives an operation command signal for controlling the field robots 301 and 302 and the object of work.

In addition, the interface unit 210 may transmit work performance information supplied from the field robots 301 and 302 to the user operation device 100.

The work command generator 220 generates a work command signal corresponding to the received information about the operation mode and the received operation command signal. Here, the work command signal is a signal for controlling a movement of the field robot 301 to be remotely controlled and a movement of the object of work.

When the user selects a monopoly mode or a following mode, the work command generator 220 generates a work command signal allowing the field robot 301 to be remotely controlled to perform an operation corresponding to the operation command signal.

On the other hand, when the user selects an object mode, the work command generator 220 generates a work command signal allowing the object of work to perform an operation corresponding to the operation command signal. In this case, the generated work command signal is a signal for controlling the operation of the object of work.

Next, when the user selects the following mode, the autonomous command generator 220 generates an autonomous operation command signal corresponding to the work command signal for the first field robot 301. This autonomous operation command signal is to control an operation of the second field robot 302.

When the user selects the object mode, the autonomous command generator 230 generates a work command signal for controlling the first and second field robots 301 and 302 in order to operate the object of work in accordance with the work command signal.

In addition, when the user selects a reproduction mode, the autonomous command generator 230 extracts and generates an autonomous operation command signal corresponding to the work command signal which the user selects as a signal to be repeatedly executed.

The communication unit 240 communicates with the robot teleoperating device 200 and at least one of the field robots 301 and 302. The communication unit 240 transmits the generated autonomous operation command signal to the field robots 301 and/or 302. In addition, when the user selects the following mode, the communication unit 240 may transmit the generated work command signal to the field robots 301 to be remotely controlled.

The storage unit 250 stores the generated work command signal and the generated autonomous operation command signal. When receiving work performance information from the field robots 301 and 302, the storage unit 250 may additionally store the received information.

When the user selects the reproduction mode, the autonomous command generator 230 extracts the corresponding autonomous operation command signal among the work command signals, the autonomous operation command signals, and the work performance information that are stored in the storage unit 250, and then transmits the extracted autonomous operation command signal to the corresponding field robots 301 and 302.

Hereinafter, methods for remotely controlling the robot accordance with the exemplary embodiments of the present disclosure are described in detail with reference to FIG. 3 to FIG. 9.

Figure 3:
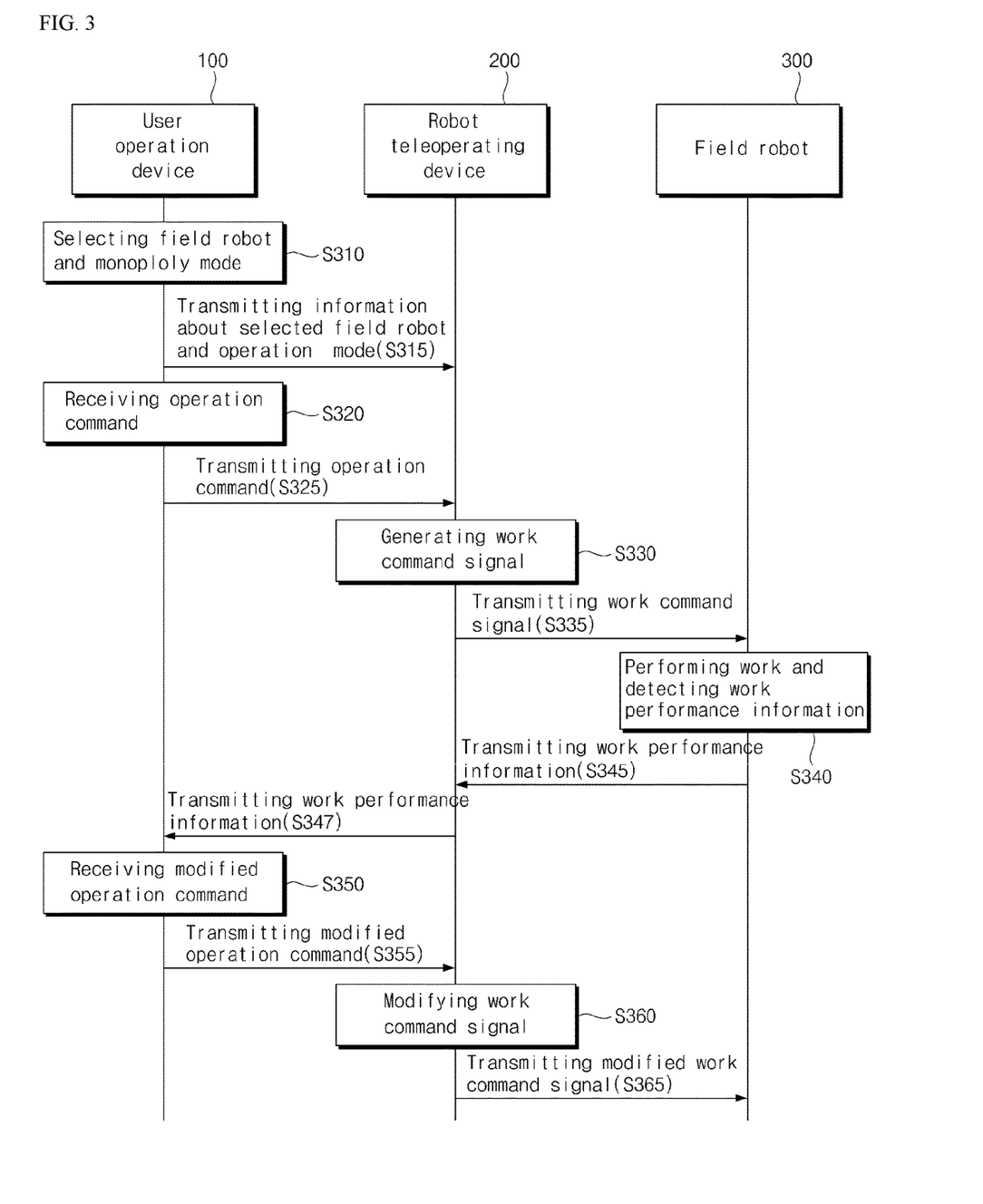
FIG. 3 is a flowchart for illustrating a method for remotely controlling the robot in the monopoly mode in accordance with an exemplary embodiment of the present disclosure.
Figure 4:
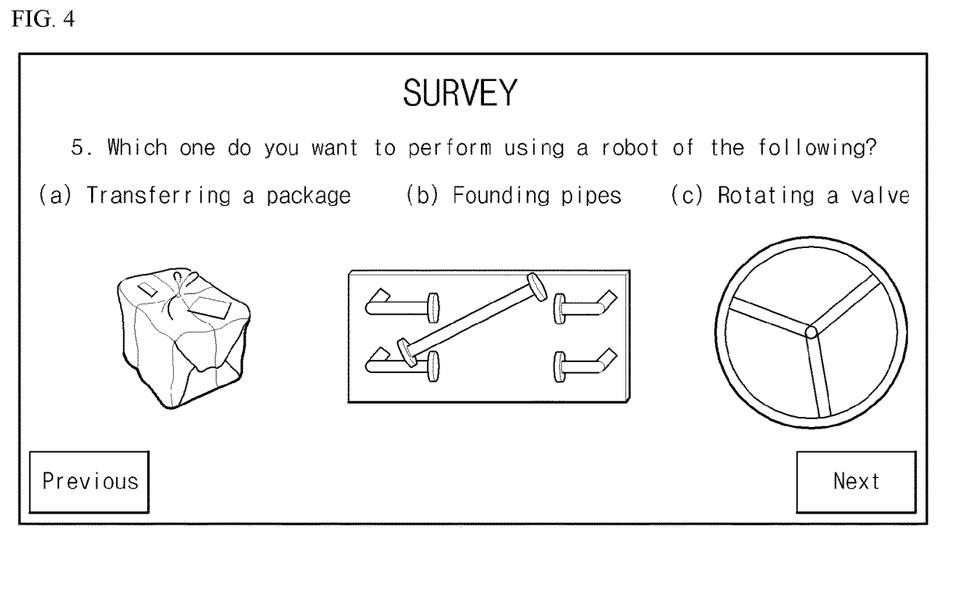
FIG. 4 is an example of an image displayed in the user operation device in accordance with the exemplary embodiment of the present disclosure.

FIG. 3 is a flowchart for illustrating a method for remotely controlling the robot in the monopoly mode in accordance with an exemplary embodiment of the present disclosure, and FIG. 4 is an example of an image displayed in the user operation device in accordance with the exemplary embodiment of the present disclosure.

Referring to FIG. 3, the user operation device 100 receives information about the field robot to be remotely controlled and selection of the monopoly mode from the user at step S310, and transmits the information about the selected field robot and the monopoly mode to the robot teleoperating device 200 at step S315.

In this case, it is assumed that the user selects the field robot 301 as an object to be remotely controlled among a plurality of field robots, and the monopoly mode as an operation mode. The monopoly mode is a mode in which one person controls operations of one selected robot using an 1:1 remote control method.

At step S310, the user operation device 100 receives selection of any one among the monopoly mode, following mode, object mode, and reproduction mode as an operation mode from the user. The user may select the operation mode in an image displayed in the user operation device 100, as shown in FIG. 4. When the user does not determine whether to select any mode to perform work, the user operation device 100 displays a representative situation for each operation mode for the user and the user may select the operation mode from the displayed image. Like this, the user may select the operation mode in convenience.

For example, when the user selects carrying a package in the image of FIG. 4, the user operation device 100 receives selection of the monopoly mode as the operation mode. In addition, the user operation device 100 additionally receives information about the volume and weight of the package. In this case, if the work can be performed by one field robot, the monopoly mode is selected, while the following mode may be selected if the work needs two or more field robots due to the large volume and heavy weight.

In addition, in the case in which the work can be more easily performed when the user controls operations of the object of work, for example, in the case of founding a pipe, the user operation device 100 selects the object mode as the operation mode for the corresponding work. In the case of the work requiring cooperation of two or more field robots, like rotating a valve, the user operation device 100 may select the following mode. In this mode, a field robot operates following another field robot, or two field robots symmetrically operate.

Next, the user operation device 100 receives the operation command signal from the user at step S320, and transmits it to the robot teleoperating device 200 at step S325.

The user operation device 100 detects a motion of the user and generates an operation command signal based on the detected motion. In this case, the user operation device 100 may use a joystick, a touchpad, a trackball, or a pointing stick for detecting the motion of the user. Differently, various motion sensors may be used to detect the motion of the user.

After receiving the operation command signal from the user operation device 100, the robot teleoperating device 200 generates a work command signal corresponding to the received operation command signal at step S330, and transmits it to the first field robot 301 to be remotely controlled at step S335.

In the monopoly mode, the robot teleoperating device 200 generates a work command signal for controlling the first field robot 301 to perform an operation corresponding to the received work command signal. For example, when receiving the operation command signal for transferring the object of work, the robot teleoperating device 200 generates a work command signal for moving the first field robot 301 to a desired place and transmits it to the first field robot 301.

Then, the first field robot 301 to which the work command signal is transmitted performs an operation corresponding to the received work command signal, and detects work performance information at step S340.

For example, when receiving the work command signal for transferring the object of work at step S335, the field robot 301 lifts the object of work and then transfers it to a place corresponding to the received work command signal.

While performing these steps, the field robot 301 detects work performance information using various sensors. The detected work performance information may include at least one of physical work performance information, such as location information and contact information, and environmental work performance information, such as sound information and image information.

In addition, the field robot 301 transmits the detected work performance information to the robot teleoperating device 200 at step S345, and the robot teleoperating device 200 transmits the received information to the user operation device 100 at step S347.

The user operation device 100 outputs the received work performance information in a manner to be recognized by the user.

The user operation device 100 receives the modified operation command signal from the user at step S350. The step S350 is substantially same as the previous step S320, so the duplicated description will be omitted.

The user may grasp the situations of the actual work site in real time by receiving the work performance information detected by the field robot 301 at step S340. In addition, the user may generate an operation command signal for controlling the field robot 301 in real time depending on the situation of the work site, and may transmit it to the robot teleoperating device 200.

For example, the user determines whether to further move the field robot 301 on the basis of the location information detected by the field robot 301, and may generate the next operation command signal, or may modify the operation command signal when finding an obstacle placed in front of the field robot 301 in an image photographed by the field robot 301.

Next, the robot teleoperating device 200 receives the modified operation command signal from the user operation device 100 at step S355, and modifies the work command signal to correspond to the modified operation command at step S360.

Then, the robot teleoperating device 200 transmits the modified work command signal to the field robot 301 at step S365, and thus the field robot 301 performs an operation corresponding to the modified work command signal.

In the above, the user operation device 100 that outputs the received work performance information, receives the modified operation command signal from the user, and then transmits it to the robot teleoperating device 200 was described. However, the present disclosure is not necessarily limited thereto. The robot teleoperating device 200 may automatically modify the operation command signal using the work performance information supplied from the field robot 301 and then may transmit the modified operation command signal to the field robot 301.

For example, when the field robot 301 is remotely controlled for compression work, the field robot 301 may collect contact information from sensors which are attached to end portions of both arms thereof to collect the contact information at step S 340.

After receiving the work performance information including the contact information, the robot teleoperating device 200 performs modeling of the field robot 301, the exterior work environment, and the contact situation with an imaginary mass-damper-spring system, and may modify the work command signal for controlling the operation of the field robot 301 associated with a compressed distance, speed, and acceleration when the field robot 301 compresses the object of work, by controlling mass, damper and spring-related factors.

In addition, if a wall is detected in the front of the field robot 301 performing a transfer work, the robot teleoperating device 200 may automatically modify the work command signal by changing a path of the field robot 301 so that it moves across the wall.

Figure 5:
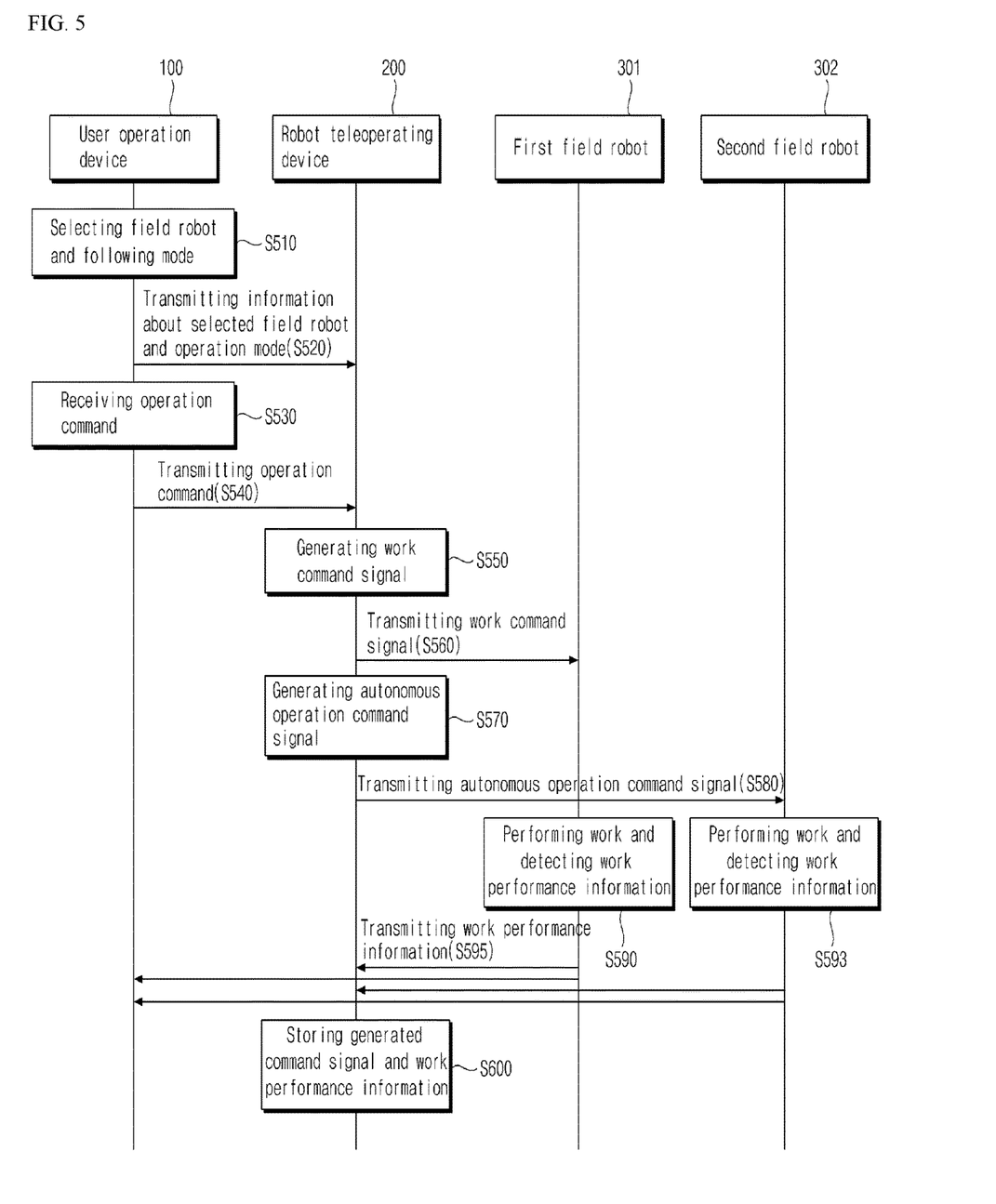
FIG. 5 is a flowchart for illustrating a method for remotely controlling the robot in the following mode in accordance with another exemplary embodiment of the present disclosure.

FIG. 5 is a flowchart for illustrating a method for remotely controlling the robot in the following mode in accordance with another exemplary embodiment of the present disclosure.

First, at step S510, the user operation device 100 receives information about the first field robot 301 serving as a master and the second field robot 301 serving as a slave from the user. In addition, the user operation device 100 receives selection of the following mode from the user in this step. Then, at step S520, the user operation device 100 transmits the information about the selected field robots 301 and 302 and the selected operation mode to the robot teleoperating device 200.

In these steps, it is assumed that the user selects the following mode as an operation mode and the user operation device 100 receives such a selection. The following mode is a mode in which the master field robot that operates according to the operation command signal supplied from the user and the slave field robot that operates according to the autonomous operation command signal which makes the slave field robot operate following the operation of the master field robot. That is, in this mode, two field robots operate, cooperating with each other.

The user operation device 100 receives an operation command signal form the user at step S530, and then transmits it to the robot teleoperating device 200 at step S540.

Next, the robot teleoperating device 200 generates a work command signal corresponding to the received operation command signal at step S550, and then transmits it to the first field robot 301 at step S560.

The steps S510 to S560 are substantially same as the steps S310 to S335, so the duplicated description will be omitted.

In addition, the robot teleoperating device 200 generates an autonomous operation command signal corresponding to the generated work command signal at step S570, and transmits it to the second field robot 302 at step S580.

In this case, the autonomous operation command signal may be same as the work command signal, or it may be a signal for controlling the second field robot 302 to operate symmetrically to a movement of the first field robot 301 operating according to the work command signal, centering a particular rotation axis of the movement.

After receiving the work command signal and the autonomous operation command signal, the first field robot 301 and the second field robot 302 respectively perform operations corresponding to the received signals, and detect work performance information, at steps S590 and S593.

At step S595, the first and second field robots 301 and 302 transmit the detected work performance information to the robot teleoperating device 200. In this case, the first and second field robots 301 and 302 may transmit the work performance information to the user operation device 100, and the robot teleoperating device 200 may also transmit the work performance information supplied from the first and second field robots 301 and 302 to the user operation device 100.

The robot teleoperating device 200 stores the generated work command signal, the generated autonomous operation command signal, and the work performance information at step S600.

The work command signal, the autonomous operation command signal, and the work performance information stored in the robot teleoperating device 200 are extracted and regenerated as an autonomous operation command signal in the reproduction mode which will be described later. Accordingly, without the work command signal newly transmitted from the user, the first and second field robots 301 and 302 can be controlled in the reproduction mode.

In addition, in the following mode, the robot teleoperation system according to another exemplary embodiment of the present disclosure can control the first and second field robots 301 and 302 by further executing the steps S347 to S365 of FIG. 3 in which the work command signal is modified to correspond to the work performance information detected by the first and second field robots 301 and 302.

Figure 6:
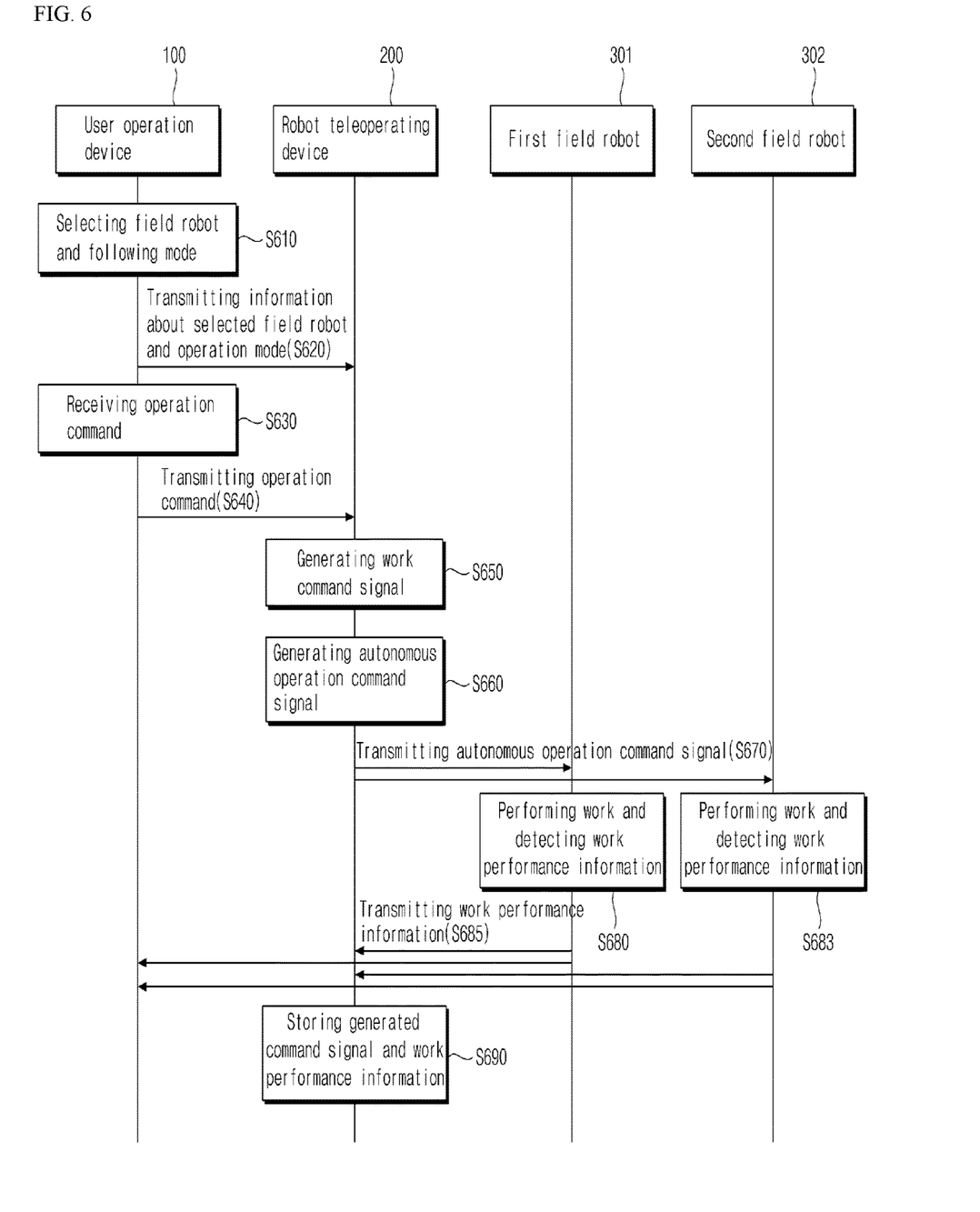
FIG. 6 is a flowchart for illustrating a method for remotely controlling the robot in the object mode in accordance with still another exemplary embodiment of the present disclosure.

FIG. 6 is a flowchart for illustrating a method for remotely controlling the robot in the object mode in accordance with still another exemplary embodiment of the present disclosure.

First, the user operation device 100 receives information about the first and second field robots 301 and 302 to be remotely controlled and selection of the object mode from the user at step S610, and then transmits the information about the selected field robots 301 and 302 and information about the selected operation mode to the robot teleoperating device 200 at step S620.

Next, the user operation device 100 receives an operation command signal from the user at step S630, and transmits it to the robot teleoperating device 200 at step S640.

Next, the robot teleoperating device 200 generates a work command signal for the object of work at step S650. The work command signal generated in this step is a signal for inducing a desired operation of the object of work that is asymmetrically executed like rotation of a pipe.

The steps S610 to S650 are substantially same as the steps S310 to S330 of FIG. 3, so the duplicated description will be omitted.

Next, the robot teleoperating device 200 generates an autonomous operation command signal corresponding to the generated work command signal at step S660, and transmits it to the first field robot 301 and the second field robot 302 at step S670. The autonomous operation command signal generated in this step is a signal for controlling the first field robot 301 and the second field robot 302 so that the object of work performs the desired operation.

After receiving the autonomous operation command signal, the first field robot 301 and the second field robot 302 perform work corresponding to the received signal, respectively, at step S680 and step S683.

Next, the first field robot 301 and the second field robot 302 transmit the detected work performance information to the robot teleoperating device 200 at step S685. In this case, the first and second field robots 301 and 302 may also transmit the work performance information to the user operation device 100. Differently, the robot teleoperating device 200 may transmit the work performance information supplied from the first and second field robots 301 and 302 to the user operation device 100.

After receiving the work performance information, the robot teleoperating device 200 stores the generated work command signal, the generated autonomous operation command signal, and the work performance information at step S690. Such stored signals and information are used as an autonomous operation command signal when the user selects the reproduction mode.

In this mode, the robot teleoperation system according to still another exemplary embodiment of the present disclosure may control the first and second field robots 301 and 302 by further executing steps S347 to S365 of FIG. 3 in which the work command signal is modified to correspond to the work performance information detected by the first and second field robots 301 and 302.

Figure 7:
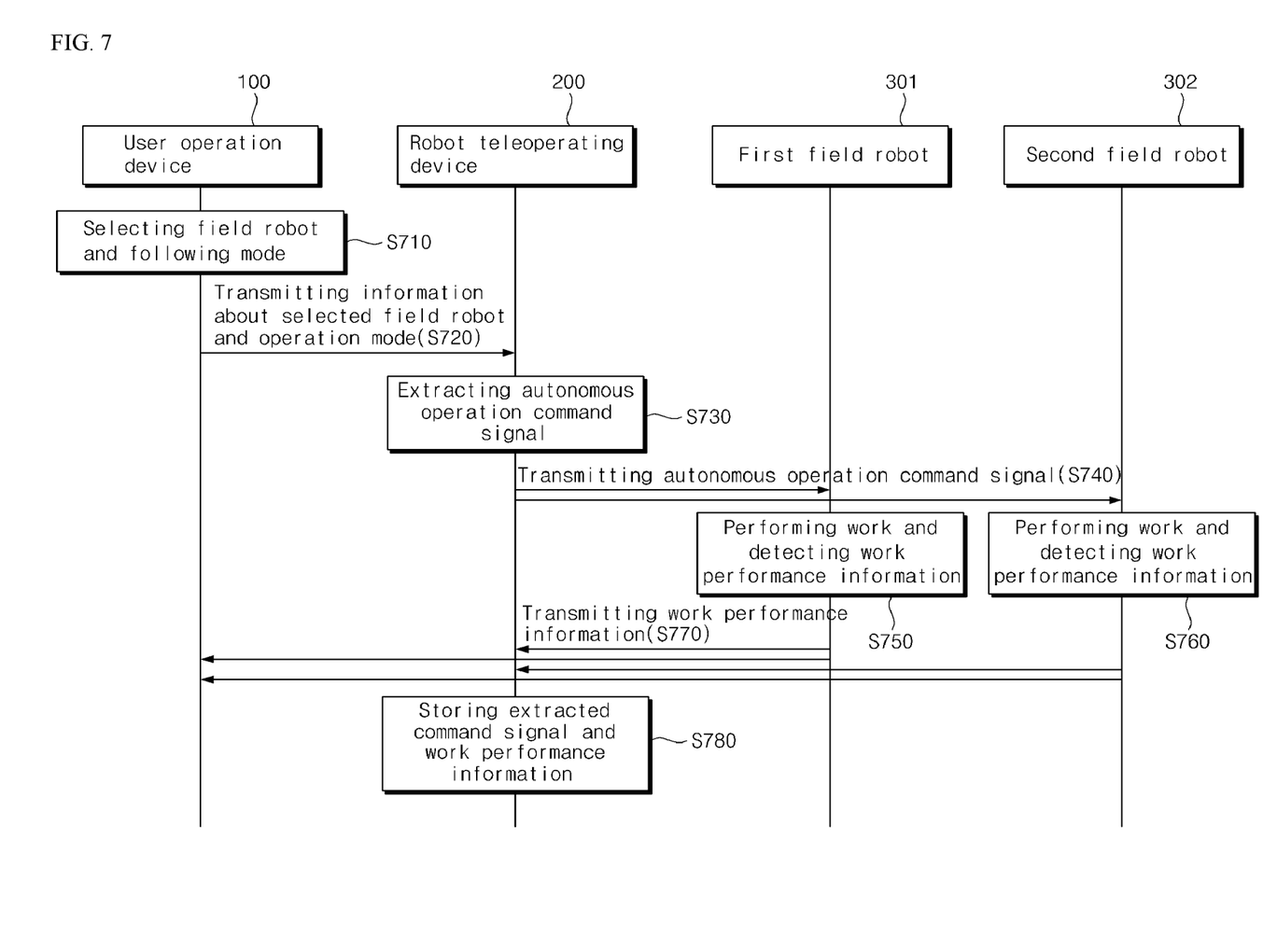
FIG. 7 is a flowchart for illustrating a method for remotely controlling the robot in the reproduction mode in accordance with still yet another exemplary embodiment of the present disclosure. The reproduction mode is a mode proposed for reducing fatigue of the user which may increase when the user repeatedly performs simple work like opening and closing a valve.

FIG. 7 is a flowchart for illustrating a method for remotely controlling the robot in the reproduction mode in accordance with still yet another exemplary embodiment of the present disclosure. The reproduction mode is a mode proposed for reducing fatigue of the user which may increase when the user repeatedly performs simple work like opening and closing a valve.

First, the user operation device 100 receives information about the first and second field robots 301 and 302 to be remotely controlled and selection of the reproduction mode from the user at step S710, and then transmits the information about the selected field robots 301 and 302 and information about the reproduction mode to the robot teleoperating device 200 at step S720. Here, in the information about the reproduction mode selected as an operation mode, information about the work command signal to be repeatedly executed and information about the number of repetitions thereof are additionally included.

The steps S710 to S720 are substantially same as the steps S310 to S315 of FIG. 3, so the duplicated description will be omitted.

Next, the robot teleoperating device 200 extracts the autonomous operation command signal corresponding to the work command signal to be repeatedly executed at step S730.

The robot teleoperating device 200 extracts the autonomous operation command signal corresponding to information about work directed to be repeatedly performed by the user, among the already stored work command signals.

For example, when the user performs opening and closing a valve in the following mode, the robot teleoperating device 200 stores the work command signal for the corresponding work and the generated autonomous operation command signal. If the first and second field robots 301 and 302 cooperating with each other successively rotate the valve by 360 degrees or more in this mode, it is necessary to repeatedly rotate the respective robots by a predetermined angle from initial positions of the robots (for example, they may be positions where the respective robots contact with a wheel of a round-shaped valve), centering a rotational axis of the valve rotation, so as to avoid interference between the robots. To perform the above operation, the user operation device 100 receives information about the corresponding work command, and the number of repetitions from the user.

The robot teleoperating device 200 to which the information about the reproduction mode is transmitted from the user operation device 100 extracts the autonomous operation command signal corresponding to the work of rotating the valve by a predetermined angle among the already stored work command signals.

Next, at step S740, the robot teleoperating device 200 transmits the extracted and generated autonomous operation command signal to the first and second field robots 301 and 302 selected at step S710.

Then, after receiving the autonomous operation command signal, the first field robot 301 and the second field robot 302 perform works corresponding to the received signal, respectively, at step S750 and step S760.

While performing the work, the first field robot 301 and the second field robot 302 may detect work performance information, and may transmit the detected information to the robot teleoperating device 200 and the user operation device 100 at step S770.

Differently, the first and second field robots 301 and 302 do not directly transmit the work performance information to the user operation device 100, and the robot teleoperating device 200 may transmit the work performance information to the user operation device 100.

Next, at step S780, the robot teleoperating device 200 stores the autonomous operation command signal extracted at step S730 and the work performance information received from the first and second field robots 301 and 302.

The robot teleoperation system according to still yet another exemplary embodiment of the present disclosure may control the first and second field robots 301 and 302 by modifying the work command signal to correspond to the work performance information detected by the first and second field robots 301 and 302, through the steps S770 and S780.

Figure 8:
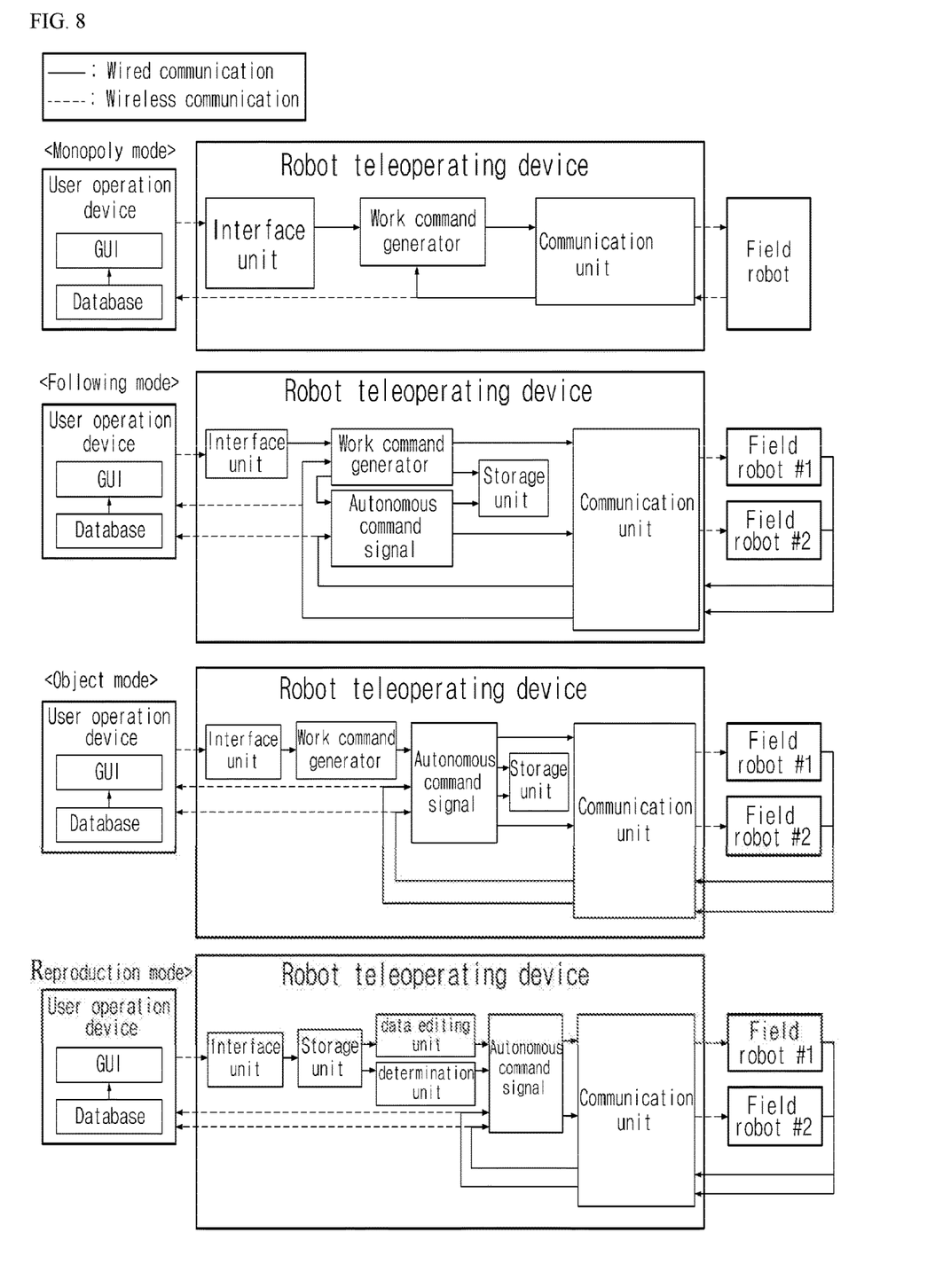
FIG. 8 is a diagram for illustrating a scheme of the robot teleoperation system according to the exemplary embodiment of the present disclosure and flow of the signals in the system.

FIG. 8 is a diagram for illustrating a scheme of the robot teleoperation system according to the exemplary embodiment of the present disclosure and flow of the signals in the system.

Referring to FIG. 8, the robot teleoperation system according to the exemplary embodiment of the present disclosure may operate in the monopoly mode, following mode, object mode, and reproduction mode.

First, if the user selects the monopoly mode, the work command generator 220 of the robot teleoperating device 200 generates a work command signal allowing the field robot 301 that is remotely controlled to perform an operation corresponding to an operation command signal, and transmits it to the corresponding field robot 301, whereby the field robot 301 is remotely controlled.

If the user selects the following mode, the work command generator 220 of the robot teleoperating device 200 generates a work command signal for the first field robot 301 to be remotely controlled, and the autonomous operation command generator 230 generates an autonomous operation command signal for controlling an operation of the second field robot 302. Then, the generated work command signal and autonomous operation command signal are respectively transmitted to the first and second field robots 301 and 302, whereby the first and second field robots 301 and 302 are remotely controlled.

If the user selects the object mode, the work command generator 220 of the robot teleoperating device 200 generates a work command signal corresponding to the received operation command signal. In this case, the work command signal is a signal enabling the object of work to perform a desired operation. The autonomous operation command generator 230 generates an autonomous operation command signal for controlling the first and second field robots 301 and 302 so that the object of work operates to correspond to the work command signal, and then transmits it to the first and second field robots 301 and 302.

If the user selects the following mode and object mode, the robot teleoperating device 200 may store the generated work command signal and autonomous operation command signal in the storage unit 250.

If the user selects the reproduction mode, the autonomous operation command generator 230 extracts the autonomous operation command signal corresponding to the work command signal that should be repeatedly executed among the already stored work command signals and autonomous operation command signals, and transmits it to the first and second field robots 301 and 302.

In this case, the robot teleoperating device 200 may further include a data editing unit and a determination unit. The data editing unit may edit or modify the extracted autonomous operation command signal, and the determination unit may determine the number of repetitions of the corresponding autonomous operation command signal based on the number of repetitions inputted when the user selects the reproduction mode.

Regardless of what operation mode is used, the interface unit 210 communicates with the user operation device 100, and the communication unit 240 communicates with the field robots 301 and 302. When the field robots 301 and 302 detect work performance information, the communication unit 240 receives the detected work performance information, and the interface unit 210 transmits the received work performance information to the user operation device 100.

Figure 9:
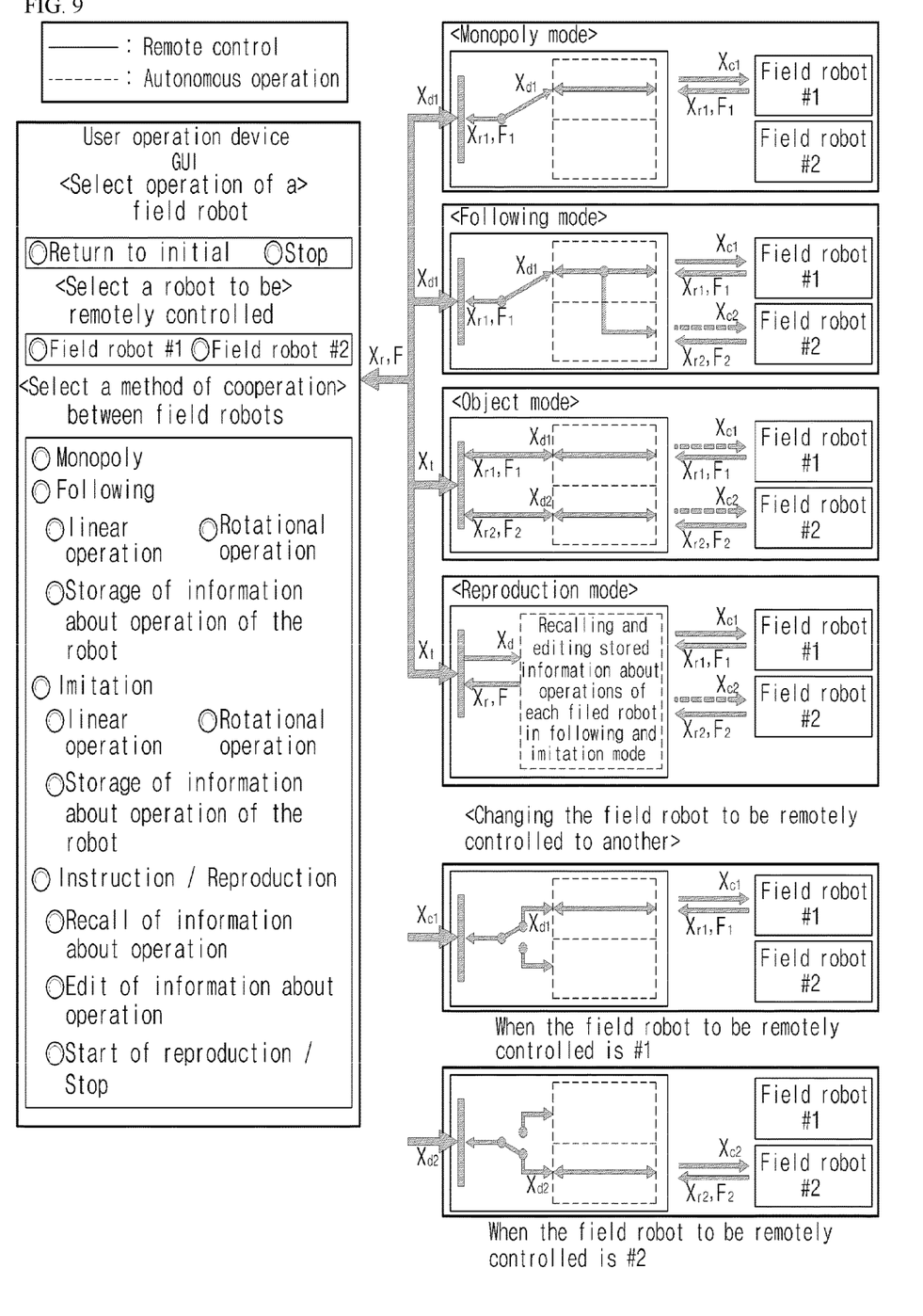
FIG. 9 is a diagram for illustrating flows of the control signals for the respective operation modes of the robot teleoperation system according to the exemplary embodiment of the present disclosure.

FIG. 9 is a diagram for illustrating flows of the control signals for the respective operation modes of the robot teleoperation system according to the exemplary embodiment of the present disclosure.

In FIG. 9, $X_d$ is an operation command signal representing information about a target movement of the field robot, $X_r$ is work performance information that means information about actual movements of the field robot, $X_c$ is the modified work command signal and autonomous operation command signal for the field robots based on the work performance information, $X_t$ is an operation command signal representing a target operation of the object of work, and F is contact information between the field robot and peripheral work environment.

Referring to FIG. 9, when the monopoly mode is selected, the user operation device 100 generates an operation command signal $X_{d1}$ for operating the first field robot #1, and transmits it to the robot teleoperating device 200. The robot teleoperating device 200 to which the operation command signal $X_{d1}$ is transmitted generates a work command signal $X_{c1}$ and transmits it to the first field robot #1, thereby controlling the first field robot #1.

The robot teleoperating device 200 transmits work performance information $X_{r1}$ and contact information $F_1$ supplied from the first field robot #1 to the user operation device 100. The user operation device 100 generates an operation command signal modified based on a location-based impedance control method, and transmits it to the robot teleoperating device 200. The robot teleoperating device 200 modifies the work command signal to correspond to the modified operation command signal transmitted from the user operation device and generates a modified work command signal $X_{c1}$. Then, the modified work command signal $X_{c1}$ is transmitted to the first field robot #1.

In addition, in the monopoly mode, the field robot to be remotely controlled may be converted to another by a switch, as shown in FIG. 9.

Next, when the following mode is selected, the user operation device 100 generates an operation command signal $X_{d1}$ for operating the first field robot #1, and transmits it to the robot teleoperating device 200. The robot teleoperating device 200 to which the operation command signal $X_{d1}$ is transmitted generates a work command signal $X_{c1}$ and an autonomous operation command signal $X_{c2}$, and respectively transmits them to the first field robot #1 and the second field robot #2 in order to control the first field robot #1 and the second field robot #2.

The first field robot #1 generates work performance information $X_{r1}$ and contact information $F_1$, and transmits them to the robot teleoperating device 200, while the second field robot #2 generates work performance information $X_{r2}$ and contact information $F_2$, and transmits them to the robot teleoperating device 200. The robot teleoperating device 200 transmits the received information $X_{r1}$, $F_1$, $X_{r2}$ and $F_2$ to the user operation device 100. The user operation device 100 transmits the operation command signal modified using a location-based impedance control method based on the received information $X_{r1}$, $F_1$, $X_{r2}$ and $F_2$ to the robot teleoperating device 200. The robot teleoperating device 200 to which the modified operation command signal is transmitted modifies the work command signal, generates work command signals $X_{c1}$ and $X_{c2}$, and then respectively transmits them to the first field robot #1 and the second field robot #2.

In addition, when the object mode is selected, the user operation device 100 generates an operation command signal $X_t$ for a target operation of the object of work, and transmits it to the robot teleoperating device 200. The robot teleoperating device 200 generates autonomous operation command signals $X_{c1}$ and $X_{c2}$, and respectively transmits them to the first field robot #1 and the second field robot #2.

The work performance information $X_{r1}$, $F_1$, $X_{r2}$ and $F_2$ detected by the first field robot #1 and the second field robot #2 are transmitted to the user operation device 100 through the robot teleoperating device 200. The user operation device 100 transmits the operation command signal modified using a location-based impedance control method based on the received information $X_{r1}$, $F_1$, $X_{r2}$ and $F_2$ to the robot teleoperating device 200. The robot teleoperating device 200 to which the modified operation command signal is transmitted modifies the autonomous operation command signal, generates autonomous operation command signals $X_{c1}$ and $X_{c2}$, and then respectively transmits them to the first field robot #1 and the second field robot #2.

Last, when the reproduction mode is selected, the user operation device 100 transmits an operation command signal $X_t$ including information about work command to be repeatedly executed and the number of repetitions to the robot teleoperating device 200. The robot teleoperating device 200 extracts the autonomous operation command signals $X_{c1}$ and $X_{c2}$ corresponding to the operation command signal $X_t$, and respectively transmits them to the first field robot #1 and the second field robot #2.

In addition, the robot teleoperating device 200 receives the work performance information $X_{r1}$, $F_1$, $X_{r2}$ and $F_2$ from the first field robot #1 and the second field robot #2, and transmits them to the user operation device 100. Next, the user operation device 100 transmits the modified operation command signal using a location-based impedance control method to the robot teleoperating device 200. Then, the robot teleoperating device 200 modifies the autonomous operation command signals $X_{c1}$ and $X_{c2}$ and respectively transmits them to the first field robot #1 and the second field robot #2.

The robot teleoperation system using the robot teleoperating device of the present disclosure and the control method thereof can be applied to outdoor tasks that the 1:1 remote control system cannot perform due to some technical limitations. In addition, the robot teleoperation system of the present disclosure can minimize labor of the operator. Accordingly, some problems, such as degrade of efficiency and quality of the work, and occurrence of negligent accidents that may occur when fatigue of the operator increases can be resolved.

Example embodiments have been disclosed herein and although specific terms are employed, they are used and are to be interpreted in a generic and descriptive sense only and not for purpose of limitation. In some instances, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for remotely controlling field robots, comprising:
    an interface unit configured to receive information about the field robots including a first field robot and a second field robot, operation modes including a monopoly mode, a following mode, an object mode and a reproduction mode, and operation command signals for the first field robot, the second field robot, and an object of work;
    a work command generator configured to generate work command signals corresponding to the operation modes and the operation command signals, wherein when the following mode is selected, the work command generator is configured to generate a work command signal for controlling the first field robot, and when the object mode is selected, the work command generator is configured to generate a work command signal for controlling an operation of the object of work that is asymmetrically executed;
    an autonomous command generator configured to generate autonomous operation command signals corresponding to the operation modes and the work command signals, wherein when the following mode is selected, the autonomous command generator is configured to generate an autonomous operation command signal for controlling the second field robot to follow the first field robot or symmetrically operate to the first field robot, and when the object mode is selected, the autonomous command generator is configured to generate an autonomous operation command signal for controlling the first field robot and the second field robot to induce the operation of the object of work that is asymmetrically executed;
    a communication unit configured to transmit the autonomous operation command signals to the first field robot or the second field robot; and
    a storage unit configured to store the work command signals, the autonomous operation command signals, and work performance information supplied from the first field robot and the second field robot, wherein
    when the reproduction mode is selected, and one of the work command signals is selected as a signal to be repeatedly executed, the autonomous command generator is configured to extract one of the autonomous operation command signals corresponding to the one of the work command signals from the storage unit, and when the reproduction mode is selected, information about the work command signal to be repeatedly executed and information about a number of repetitions to be repeatedly executed are received by the interface unit.

2. The apparatus of claim 1, further comprising an user operation device configured to detect a motion of the user, and to generate an operation command signal corresponding to the motion of the user.

3. The apparatus of claim 2, wherein when the monopoly mode is selected, the work command generator is configured to generate a work command signal for controlling the first field robot or the second field robot corresponding to the motion of the user.

4. The apparatus of claim 1, wherein the communication unit is configured to receive the work performance information including at least one of location information, sound information, image information, and contact information from the first field robot and the second field robot, and the autonomous command generator is configured to directly modify the autonomous operation command signals to correspond to the work performance information.

5. A computer-implemented control method for remotely controlling field robots, comprising:
    receiving information about the field robots including a first field robot and a second field robot, operation modes including a monopoly mode, a following mode, an object mode and a reproduction mode, and operation command signals for the first field robot, the second field robot, and an object of work;
    generating work command signals corresponding to the operation modes and the operation command signals, wherein when the following mode is selected, a work command signal for controlling the first field robot is generated, and when the object mode is selected, a work command signal for controlling an operation of the object of work that is asymmetrically executed is generated;
    generating an autonomous operation command signals corresponding to the operation modes and the work command signals, wherein when the following mode is selected, an autonomous operation command signal for controlling the second field robot to follow the first field robot or symmetrically operate to the first field robot is generated, and when the object mode is selected, an autonomous operation command signal for controlling the first field robot and the second field robot to induce the operation of the object of work that is asymmetrically executed is generated;
    transmitting the autonomous operation command signals to the first field robot or second field robot;
    storing the work command signals, the autonomous operation command signals, and work performance information supplied from the first field robot and the second field robot; and
    when the reproduction mode is selected and one of the work command signals is selected as a signal to be repeatedly executed, extracting one of the autonomous operation command signals corresponding to the one of the work command signals from the storage unit, and
    when the reproduction mode is selected, information about the work command signal to be repeatedly executed and information about a number of repetitions to be repeatedly executed are received by the interface unit.

6. The method of claim 5, further comprising detecting a motion of a user, and generating an operation command signal corresponding to the motion of the user.

7. The method of claim 6, further comprising when the monopoly mode is selected, generating a work command signal for controlling the first field robot or the second field robot corresponding to the motion of the user.

8. The method of claim 5, further comprising:
    receiving the work performance information including at least one of location information, sound information, image information, and contact information from the first field robot and the second field robot; and
    directly modifying the autonomous operation command signals to correspond to the work performance information.

* * * * *